United States Patent [19]

Kalina et al.

[11] 4,046,523

[45] Sept. 6, 1977

[54] SYNTHESIS GAS PRODUCTION

[75] Inventors: Theodore Kalina, Morris Plains, N.J.; Roger E. Moore, El Paso, Tex.

[73] Assignee: Exxon Research and Engineering Company, Linden, N.J.

[21] Appl. No.: 512,592

[22] Filed: Oct. 7, 1974

[51] Int. Cl.² .............................................. C07C 9/04
[52] U.S. Cl. ................................... 48/197 R; 48/202; 48/214 A; 252/447
[58] Field of Search ................... 48/190, 197 R, 202, 48/206, 214 R, 214 A; 252/447 R, 373

[56] References Cited

U.S. PATENT DOCUMENTS

| | | | |
|---|---|---|---|
| 2,517,177 | 8/1950 | Carter | 252/447 X |
| 2,754,187 | 6/1956 | Bond et al. | 48/196 R |
| 3,004,839 | 10/1961 | Tornquist | 48/197 R |
| 3,201,215 | 8/1965 | Negra et al. | 48/214 A |
| 3,441,393 | 4/1969 | Finneran et al. | 48/214 R |
| 3,506,417 | 4/1970 | Hepp | 48/197 R |
| 3,615,300 | 10/1971 | Holm | 48/197 R X |
| 3,617,481 | 11/1971 | Voorhies, Jr. et al. | 252/447 |
| 3,625,664 | 12/1971 | Padovani | 48/197 R |
| 3,684,689 | 8/1972 | Patton et al. | 48/197 R X |
| 3,689,240 | 9/1972 | Aldridge et al. | 48/202 |
| 3,728,093 | 4/1973 | Cofield | 48/197 R X |
| 3,740,193 | 6/1973 | Aldridge et al. | 48/202 |
| 3,774,981 | 7/1973 | Ward | 48/197 R X |
| 3,803,023 | 4/1974 | Hamner | 48/197 R X |
| 3,816,298 | 6/1974 | Aldridge | 48/197 R X |
| 3,838,993 | 10/1974 | Aldridge | 48/197 R X |
| 3,838,994 | 10/1974 | Aldridge | 48/215 |
| 3,850,840 | 11/1974 | Aldridge et al. | 252/373 |
| 3,850,841 | 11/1974 | Aldridge et al. | 252/373 |
| 3,853,498 | 12/1974 | Bailie | 48/197 R X |
| 3,870,481 | 3/1975 | Hagarty | 48/197 R X |
| 3,890,112 | 6/1975 | Aldridge | 48/214 A |
| 3,890,113 | 6/1975 | Child et al. | 48/214 R |
| 3,904,744 | 9/1975 | Pagel | 48/214 A |
| 3,958,957 | 5/1976 | Koh et al. | 47/197 R |

FOREIGN PATENT DOCUMENTS 450,416   7/1936   United Kingdom

Primary Examiner—Morris O. Wolk
Assistant Examiner—Michael S. Marcus
Attorney, Agent, or Firm—James E. Reed

[57] ABSTRACT

Raw synthesis gas produced by the gasification of coal, heavy oil or similar carbonaceous material is contacted with a reforming catalyst at a temperature in the range between about 1000° and about 1800° F. and at a pressure between about 100 and about 2000 psig prior to adjustment of the carbon monoxide-to-hydrogen ratio and treatment of the gas to increase its B.t.u. content. This catalytic reforming step eliminates $C_2+$ compounds in the gas which tend to form tarry downstream waste products requiring further treatment, obviates polymerization problems which may otherwise interfere with upgrading of the gas by means of the water gas shift and methanation reactions, and improves overall process thermal efficiency by making possible efficient low level heat recovery.

3 Claims, 1 Drawing Figure

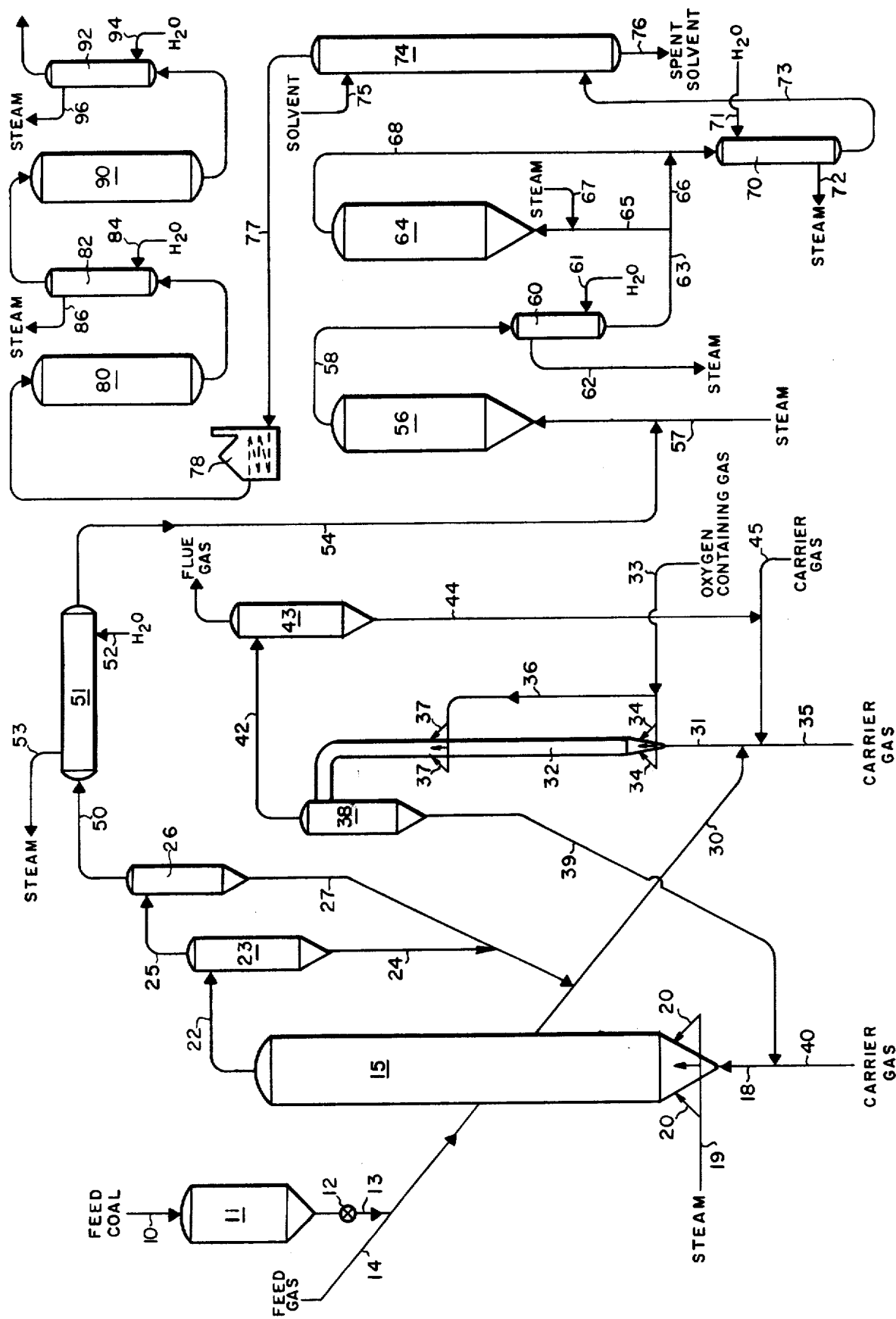

SYNTHESIS GAS PRODUCTION

BACKGROUND OF THE INVENTION

1. Field of the Invention

This invention relates to the production of synthetic fuels from coal, heavy oil and similar materials and is particularly directed to a method for the elimination of tar-forming constituents from raw synthesis gas prior to upgrading of the gas.

2. Description of the Prior Art

Conventional gasification processes for the production of synthetic fuels from coal, coke, heavy oil and similar materials generally require reaction of the carbonaceous feed material with steam to produce a synthesis gas containing carbon monoxide and hydrogen as the principal constituents, adjustment of the carbon monoxide-to-hydrogen ratio by passing at least part of the gas stream through a water gas shift reaction unit, and subsequent upgrading of the gas by passing it through a catalytic methanation unit. The raw synthesis gas produced in the initial step of the process generally contains some methane and small amounts of ethane, and some ethylene and other hydrocarbons which tend to undergo polymerization reactions and form tars and resins. Other undesirable materials present in the gas will usually include carbon dioxide, hydrogen sulfide, organic sulfur compounds, phenols, ammonia, hydrocyanic acid, nitric oxide and the like. These constituents tend to reduce the activity of the catalysts used downstream in the process and also lead to the formation of deposits in the equipment employed.

The tar-forming constituents are generally removed from the gas stream before it is introduced into the shift conversion unit. This is usually done by scrubbing the raw gas with water and/or oil to cool it and condense out the tar-forming materials. Tar and naphtha and an aqueous liquor containing phenols and other water-soluble compounds are generally recovered for further processing. The gas stream is then passed through separating devices for the removal of entrained liquids and vapors, reheated, and then introduced into the shift conversion unit for adjustment of the carbon monoxide-to-hydrogen ratio to the desired level. Following this, the gas can be further purified to remove hydrogen sulfide, carbon dioxide and any other contaminants which may adversely affect the methanation catalyst. The methanation step results in the conversion of carbon monoxide and hydrogen to methane and the production of a product gas of sufficiently high B.t.u. content to permit its use as a high grade fuel.

Although processes of the type described above are reasonably effective, such processes have certain disadvantages. Quenching of the raw synthesis gas to cool it and permit the condensation of tar-forming constituents makes it difficult to recover heat from the gas stream and results in relatively low thermal efficiencies. The effluent from this quenching operation usually includes an oily waste water which must be treated for the removal of contaminants before the water can be discharged or reused. The facilities for this represent a significant portion of the total investment and operating costs for such a process. Efforts to avoid these and related problems have in the past been largely unsuccessful.

SUMMARY OF THE INVENTION

The present invention provides an improved method for the treatment of synthesis gas prior to the introduction of such gas into a water-gas shift or methanation unit which at least in part avoids the difficulties outlined above. In accordance with the invention, it has now been found that tar-forming constituents in raw synthesis gas produced by the gasification of coal, coke, hydrocarbon oils and similar carbonaceous feedstocks can be eliminated by contacting the gas with a reforming catalyst at a temperature in the range between about 1000° and about 1800° F., preferably between about 1000° F. and about 1500° F., and at a pressure between about 100 and about 2000 psig in a low severity catalytic reforming zone prior to introducing the gas into the water-gas shift conversion unit. Such a reforming step results in the destruction of $C_2+$ condensable hydrocarbon compounds which are primarily responsible for the oily waste waters produced during conventional operations and the elimination of unsaturated compounds which tend to polymerize and create further problems during the shift conversion reaction. It also obviates the necessity for cooling down the gas stream to condense out the higher boiling constituents and subsequently reheating the gas to the shift conversion temperature, makes possible low level heat recovery from the process, and significantly improves the overall process thermal efficiency.

The reforming catalyst employed for purposes of the invention will preferably be an alkali metal catalyst prepared by heating an intimate mixture of carbon and an alkali metal constituent to an elevated temperature. Suitable alkali metal constituents include the alkali metals and alkali metal compounds such as the carbonates, bicarbonates, biphosphates, sulfates, oxalates, formates, sulfides, oxides, aluminates, hydroxides, acetates, tungstates, and the like. In general, cesium, potassium, sodium and lithium salts derived from acids having ionization constants less than $10^{-3}$ are preferred. The cesium compounds are generally most effective, followed by the potassium, sodium and lithium compounds in that order. Carbonaceous materials which may be used in forming the carbon-alkali metal catalysts include coal, petroleum coke, charcoal, activated carbon and the like. The catalysts may be prepared by impregnating the carbonaceous material with the alkali metal constituent and heating the resultant product to a temperature of about 800° F. or higher or by other methods. Other catalyst systems which may be suitable under certain conditions include those containing metallic constituents from Group VI-B and the iron group of the Periodic Table, particularly those having relatively high resistance to sulfur compounds. These will normally be supported on a carrier, preferably one having a high surface area. Suitable carriers for these other catalysts include petroleum coke, activated charcoal, activated alumina, silica-alumina, zeolites and the like.

The catalytic reforming step can be carried out in a fixed bed, moving bed or fluidized bed system employing conventional equipment. The raw synthesis gas will normally contain substantial quantities of steam carried over from the gasifier and hence the introduction of additional steam is generally unnecessary. Following the reforming step, the gas essentially free of $C_2+$ hydrocarbon compounds can be further cooled and then contacted with a water-gas shift catalyst to adjust the hydrogen-to-carbon ratio. The use of an alkali metal shift catalyst is advantageous because such catalysts are effective at temperatures substantially lower than those required with other catalyst systems and are not seriously affected by hydrogen sulfide and other sulfur compounds present in the gas. Conventional gas cleanup and methanation steps can then be employed.

DESCRIPTION OF THE DRAWING

The drawing is a schematic flow sheet of a coal gasification process carried out in accordance with the invention.

DESCRIPTION OF THE PREFERRED EMBODIMENTS

The process depicted in the drawing is one for the production of a synthetic natural gas by the gasification of coal to produce a synthesis gas containing carbon monoxide and hydrogen, adjustment of the carbon monoxide-to-hydrogen ratio by means of the water-gas shift reaction, and subsequent methanation of the shifted gas to produce a product gas stream which has a B.t.u. content approaching that of natural gas. It will be understood that the invention is not restricted to the use of coal or other solid feed materials and can also be used in connection with the gasification of heavy oils and other liquid feed streams. In the process shown, a solid carbonaceous feed material, normally bituminous coal, subbituminous coal, lignite or similar material crushed to a particle size of about 8 mesh or smaller on the Tyler Screen Scale is fed into the system through line 10 from a preparation plant or storage facility which does not appear in the drawing. If desired, this coal or other solid feed material may be impregnated or mixed with an alkali metal constituent to catalyze the gasification reaction.

The coal or other material employed as the solid feed material is introduced into a closed hopper or similar vessel 11 from which it is discharged through star wheel feeder or an equivalent device 12 in line 13 at an elevated pressure sufficient to permit its introduction into the gasification apparatus at the system operating pressure or a slightly higher pressure. The system of the invention is not restricted to this particular type of an arrangement and parallel lock hoppers, pressurized hoppers, aerated standpipes operated in series or other apparatus may be employed in lieu of or in addition to that shown in order to raise the input coal stream to the required pressure level. The use of such equipment for the handling of coal and other finely divided solids at elevated pressures has been described in the literature and will therefore be familiar to those skilled in the art. Suitable equipment is available from commercial sources.

Coal solids or other solid feed particles introduced into the system as described above are entrained in carrier gas admitted through line 14 and carried into gasifier 15. The carrier gas stream will normally consist of high pressure steam or product gas. The use of recycled product gas avoids reduction of the hydrogen concentration in the gasifier and is therefore normally preferred. The carrier gas stream is introduced into the system at a pressure between about 50 and about 2000 psig, depending upon the pressure at which gasifier 15 is operated and the solid feed material employed, and is preferably introduced at between about 100 and about 1000 psig. The gas may be preheated to a temperature in excess of about 300° F. but below the initial softening point of the coal or other hydrocarbonaceous feed material if desired. For the gasification of bituminous coals, the use of carrier gas at temperatures in the range between about 400° and about 550° F. is often advantageous. The coal or other feed particles, preferably less than about 20 mesh in size on the Tyler Screen Scale, are suspended in the carrier gas stream in a ratio between about 0.2 and about 5.0 pounds of solid feed material per pound of carrier gas. The optimum ratio for the particular system will depend in part upon the feed particle size and density, the molecular weight of the gas employed, the temperature of the solid feed material and input gas stream, and other factors. In general, ratios between about 0.5 and about 4.0 pounds of coal or other solid feed per pound of carrier gas are preferred.

The feed stream prepared by the entrainment of coal or other solid particles from line 13 in the gas introduced through line 14 is fed into the gasifier through one or more fluid-cooled nozzles not shown in the drawing. The cooling fluid will normally be low pressure steam but may also be water or the like. This fluid may be circulated within the nozzle for cooling purposes or injected into the gasifier around the stream of feed gas and entrained solids to control entry of the solids into the fluidized bed in the gasifier. The number of nozzles employed will depend primarily on the size of the gasifier. Although only one injection line is shown in the drawing, it will generally be preferred to employ a series of nozzles spaced at intervals about the gasifier periphery.

The gasifier employed in the system shown comprises a refractory lined vessel containing a fluidized bed of char particles introduced into the lower portion of the system through bottom inlet line 18. The inlet line extends upwardly through the bottom of the gasifier to a point above a grid or similar distribution device located therein. Steam for maintaining the char particles in a fluidized state and reacting with the char to produce a synthesis gas containing hydrogen and carbon monoxide is introduced into the lower portion of the gasifier below the grid or other distribution device through manifold line 19 and steam injection lines 20. The installation shown employs four steam injection lines spaced at 90° intervals about the periphery of the gasifier but a greater or lesser number may be employed if desired. The steam thus introduced will normally be fed into the system at a rate within the range between about 0.5 and about 2.0 pounds per pound of coal or other solids feed.

The upflowing steam and suspended char particles introduced into the gasifier form a fluidized bed which extends upwardly in the vessel to a level above that at which the coal or other solids feed particles are introduced with the feed gas from line 14. The upper surface of the fluidized bed within the gasifier will normally be located a substantial distance above the feed injection level but sufficiently below the upper end of the gasifier to permit disengagement of the heavier char particles that may otherwise tend to be entrained with the gas leaving the bed.

In the particular gasifier shown in the drawing, the lower portion of the fluidized bed between the grid or other distribution device and the level at which the coal or other solids feed material are introduced into the system serves as a steam gasification zone. Here the steam introduced through the manifold and steam injection lines reacts with carbon in the hot char particles to form synthesis gas containing hydrogen and carbon monoxide. The hydrogen concentration in the gaseous phase of the fluidized bed increases from essentially zero at the bottom of the bed to a value from about 30 to about 50 volume percent near the upper surface of the bed. The temperature in the steam gasification zone will generally range between about 1450° and about 1950° F. Depending upon the particular feed material and particle size employed, the gas velocities in the fluidized bed will normally range between about 0.2 and about 2.0 feet per second or more.

The upper portion of the fluidized bed in gasifier 15 serves as a hydrogasification zone where the feed coal is devolatilized and at least part of the volatile matter thus liberated reacts with hydrogen generated in the steam gasification zone below to produce methane. The level at which the solids feed stream is introduced and hence the location of the steam gasification and hydrogasification zones depends in part upon the properties of the particular coal or other carbonaceous solid which is employed as the feed material for the process. It is generally preferred to select the injection level so that the methane yield from the gasifier will be maximized and the tar yield minimized. In general, the amount of methane produced increases as the coal feed injection point is moved toward the top of the fluidized bed. The tar formed from the input coal or other carbonaceous solids normally increases as the feed injection point is moved upwardly and decreases as it is moved toward the bottom of the fluidized bed, other operating conditions being the same. The solids feed stream should generally be introduced into the gasifier at a point where the hydrogen concentration in the gas phase is in excess of about 20% by volume, preferably between about 30 and about 50% by volume.

It is normally preferred that the upper level of the fluidized bed in gasifier 15 be maintained sufficiently above the feed injection level to provide at least about 4 seconds of residence time for the gas phase in contact with the fluidized solids in the hydrogasification zone. A residence time between about 10 and about 20 seconds is normally preferred. The optimum hydrogen concentration at the feed injection point and the gas residence time above that point will vary with different types and grades of coal or other carbonaceous solids and will also change with variations in the gasifier temperature, pressure, steam rate and other process variables. Higher rank bituminous coal normally require somewhat more severe reaction conditions and longer residence times to obtain high methane yields than do coals of lower rank and other carbonaceous solids. Similarly, high reaction temperatures and steam rates generally tend to increase the hydrogen concentration of the gas phase and reduce the solids residence time needed to secure acceptable methane yields from a feed material.

Raw product gas from the fluidized bed moved upwardly from the upper surface of the bed, carrying entrained solids with it. This gas is withdrawn from gasifier 15 through overhead line 22 and passes to a cyclone separator or similar separation device 23 where the larger entrained particles are separated from the gas. The solids thus removed are conveyed downwardly through dipleg 24 for reintroduction into the system as described hereafter. The overhead gas from the separation unit is passed through line 25 to a second separation unit 26 where additional fines are removed. These particles are withdrawn by means of dipleg 27 and may be combined with the particles from dipleg 24 for reintroduction into the gasifier. An alternate procedure is to introduce the fines from diplegs 24 and 27 into a stream of char particles withdrawn from the fluidized bed in gasifier 15 by means of line 30. A dense phase stream of the combined particles is introduced into an upflowing stream of carrier gas in line 31 and carried into transfer line gasifier 32. The carrier gas may be steam, recycle product gas, flue gas, nitrogen or the like introduced through line 32. The use of recycle flue gas is generally preferred.

As the solid particles move upwardly into the transfer line burner, an oxygen-containing gas, normally air or a mixture of air and flue gas, is introduced into the burner through manifold line 33 and multiple injection nozzles 34 in sufficient quantity to initiate the combustion of carbon and promote a transition from dense phase to dilute phase flow. The combustion which thus takes place results in the generation of flue gas and heating of the unburned particles. It is normally preferred to introduce additional air or other oxygen-containing gas into the transfer line burner at one or more higher points in the burner to secure better control of the combustion process. In the system shown, additional oxygen-containing gas is passed through line 36 and injected into the upper part of the burner through multiple injection nozzles 37. The total quantity of oxygen introduced into the burner should normally be sufficient to permit the combustion of enough carbon to effect a temperature rise in the unburned particles of from about 50° to about 300° F., preferably about 200° F. The total quantity of oxygen needed and the volume of oxygen-containing gas which will be required for a particular set of operating conditions can be readily calculated. In general, it is normally preferred to inject air at the rate from about 0.02 to about 0.2 pound per pound of char being circulated through the burner. The total residence time of the char solids within the burner will normally range between about 0.3 and about 5.0 seconds. The gas velocities needed to achieve such residence times will depend in part on the dimensions of the burner and the solids throughput and can be calculated. Excessively high gas velocities which may produce undue particle attrition should be avoided.

The hot flue gas and entrained solids leaving the upper end of transfer line burner 32 are passed to cyclone separator or similar separation device 38 where the larger particles are removed from the gas stream. The separated particles, normally at a temperature of from about 50° to about 300° F. above the fluidized bed temperature, are withdrawn through standpipe 39 and introduced as a dense phase stream into an upflowing stream of carrier gas admitted into gasifier bottom inlet line 18 through carrier gas line 40. The carrier gas may be steam, recycle product gas, flue gas or the like. The use of recycle product gas is normally preferred. The hot solids are entrained in the carrier gas and carried upwardly through line 18 into the fluidized bed above the grid or other distribution device in the lower part of the gasifier. This provides the heat required to maintain the gasification reaction taking place within the gasifier.

The flue gas taken overhead from separation device 38 is passed through line 42 to a second cyclone separator or separation device 43. Here fine particles not taken out in separation unit 38 are removed from the gas and passed downwardly through standpipe 44. These fines are then entrained in a stream of carrier gas introduced into the system through line 45 and are injected into the upflowing carrier gas admitted through line 35 for reintroduction into the transfer line burner. This recycle of fines to the burner often improves the carbon utilization in the system. The flue gas taken overhead from separation unit 43 through line 47 may be passed through one or more additional cyclone separators or other devices for the removal of additional entrained fines, passed through a heat recovery system for the recovery of energy from the hot gas, and then scrubbed or otherwise treated to take out sulfur compounds and other contaminants which might otherwise tend to pollute the atmosphere. Following this, the flue gas can be vented to the atmosphere, employed as an inert gas, or used for other purposes.

The raw product gas from gasifier 15 will generally be at a temperature between about 1450° and about 1950° F. Following the removal of entrained solids from this gas stream in separation units 23 and 26, the hot gas is passed through line 50 to heat recovery unit 51. Here the gas passes in indirect heat exchange with water or other coolant introduced through line 52. Steam or hot coolant is withdrawn from the heat recovery unit through line 53. The gas and coolant throughputs are controlled in the heat recovery unit to permit a reduction in the gas temperature to a level between about 1000° and about 1800° F. Due to the pressure drop in the cyclone separators and heat recovery unit, the cooled gas emerging from unit 51 will be at a pressure somewhat lower than that in gasifier 15. It is normally preferred to maintain the pressure at as high a level as practical without providing auxiliary compression facilities. The cooled gas is then passed through line 54 to a low severity catalytic reforming unit for the elimination of $C_2+$ hydrocarbon compounds which tend to form oily downstream waste products and give rise to polymerization problems that may otherwise interfere with downstream treatment of the gas by means of the water-gas shift and methanation reactions.

The reforming unit shown in the drawing is a fluidized bed system in which the gas from line 54 is passed upwardly through a fluidized bed of catalyst maintained in reforming vessel 56. The catalyst employed may in some cases be one containing chromium, molybdenum, tungsten, nickel, iron, cobalt or a similar metal from Group VI-B or the iron group of the Periodic Table supported upon a refractory oxide carrier such as kieselguhr, kaolin, attapulgus clay, alumina, silica, zirconia, hafnia, boria or mixtures thereof. Such catalysts are often promoted by the addition of alkali or alkaline earth metals such as lithium, sodium, potassium, cesium, rhenium, rubidium, beryllium, magnesium, calcium, strontium, barium and the like. One such catalyst comprises a catalytically active nickel component which is promoted through the use of a copper-chromium or copper-chromium-manganese complex on a kieselguhr support. This particular catalyst may be further promoted by the addition of an akaline earth metal oxide. In general, catalysts of this type are sensitive to sulfur in the feed material and are thus most useful in operations using very low sulfur feeds or oils which have been hydrogenated or otherwise treated to reduce their sulfur content to less than about 25 parts per million prior to the gasification step of the process.

The preferred catalysts for use in the reforming step of the process are carbon-alkali metal catalysts prepared by heating an intimate mixture of carbonaceous solids and an alkali metal constituent to an elevated temperature, preferably between about 800° and about 1200° F. The heating step can be carried out in external apparatus or within the reaction vessel used in the process. Carbonaceous solids which may be employed in preparing these catalysts include coal, coal char, metallurgical coke, petroleum coke, charcoal, activated carbon, inert carriers having carbon deposited on their outer surfaces, and the like. Suitable carriers include silica, alumina, silica-alumina, kieselguhr, naturally occurring zeolites, synthetic zeolites, spent cracking catalysts and the like. The solid particles, whether composed substantially of carbon or made up of carbon deposited on an inert carrier, may range from fine powders to coarse lumps, particles between about 4 and about 100 mesh on the U.S. Sieve Series Scale generally being preferred. The size selected for use in a particular operation will depend in part upon the gas velocities and other conditions within the system in which the catalyst is to be used. In fluidized bed systems, the particle size determines in part the conditions under which the bed is operated. In fixed or moving bed systems, particle size is generally of somewhat less importance.

Any of a variety of alkali metal constituents can be used in preparing the carbon-alkali metal catalysts. Suitable constituents include the alkali metals themselves and alkali metal compounds such as the alkali metal carbonates, bicarbonates, formates, biphosphates, oxalates, aluminates, amides, oxides, hydroxides, acetates, sulfates, hydrosulfates, sulfides, tungstates and the like. All of these are not equally effective and hence catalysts prepared from certain alkali metal constituents may give somewhat better results under certain conditions than do others. In general, cesium, potassium, sodium and lithium salts derived from organic or inorganic acids having ionization constants less than about $1 \times 10^{-3}$ and alkali metal hydroxides are preferred. The cesium compounds are generally the most effective, followed by the potassium, sodium and lithium compounds in that order. Because of its high activity, low cost and ready availability, potassium carbonate is usually employed.

Depending upon the particular material selected, the alkali metal constituents and carbonaceous solids can be combined to form an intimate mixture of the two in a variety of different ways. A generally preferred procedure is to dissolve a water-soluble alkali metal salt or hydroxide in an aqueous carrier, impregnate the carbonaceous solids with the aqueous solution by soaking or spraying the solution onto the particles, and thereafter dry the solids. In some cases, however, the carbonaceous material can also be impregnated by suspending a finely divided alkali metal or alkali metal compound in a hydrocarbon solvent or other inert liquid carrier of low viscosity and thereafter treating the solids with the carrier containing the alkali metal constituent. In other instances, it may be advantageous to pelletize a very finely divided alkali metal or alkali metal compound, carbon, and an oil or similar binder and then heat the pellets to an elevated temperature. Other catalyst preparation methods may also be used. If an alkali metal per se is employed, care should be taken to avoid reactions with air or water which may present safety hazards.

It is generally advantageous to combine the carbonaceous material with from about 5 to about 50 weight percent of the alkali metal constituent, preferably from about 10 to about 30% by weight, in preparing the catalyst. The optimum amount of the alkali metal constituent will depend to a large extent upon the particular constituent selected. If an impregnation process is to be used in preparing the catalyst, multiple impregnation and drying steps may be employed in order to achieve high alkali metal constituent-to-carbon ratios. The particles containing the carbon and alkali metal constituent can be heated to a temperature between about 800° and about 1200° F. in an external furnace or the like but, as indicated earlier, it is often preferred to prepare a suitably intimate mixture of carbonaceous solids and the alkali metal constituent to be employed and then introduce this mixture into the reaction vessel in which the catalyst is to be used. As the particles are heated to the reaction temperature, the carbon and alkali metal constituent will react to produce the catalyst. Externally prepared catalysts may be presulfided by exposing them to hydrogen sulfide before they are used if desired.

The mechanisms which take place as a result of combining the carbonaceous solid with an alkali metal constituent and then heating the treated solid to an elevated temperature are not fully understood. Apparently, however, the alkali metal reacts with the carbon to form interlamellar carbon-alkali metal compounds or complexes. Studies have shown that neither the carbonaceous solids nor the alkali metal constituents alone are fully effective as steam reforming catalysts and that high catalytic activity is obtained only when the carbon-alkali metal compounds or complexes are used. Both constituents of the catalysts are therefore necessary. The resulting catalysts are resistant to degradation in the presence of sulfur compounds and resist sintering at high temperatures. As a result of their high activity and other beneficial properties, these catalysts have pronounced advantages over catalysts employed in the past.

The system depicted in the drawing employs a fluidized bed reforming zone and hence the catalyst particles employed will normally range in size between about 200 mesh on the Tyler Screen Scale and about 1.2 inch. The size employed in a particular operation will depend in part on the catalyst selected and the operating conditions but in general catalyst particles between about 100 mesh and about 8 mesh on the Tyler Screen Scale are preferred. These particles will preferably contain from about 1 to about 50 percent by weight of an alkali metal constituent. The use of catalysts prepared by reacting from about 5 to about 25 percent by weight of a potassium or cesium compound with coal char is particularly effective.

The synthesis gas fed to the reforming unit will normally include substantial quantities of unreacted steam from the gasifier and hence the addition of steam to the gas prior to the reforming step is normally unnecessary. If the synthesis gas stream contains less than about 10 mol percent steam, however, additional steam introduced into the system through line 57 may be mixed with the gas prior to its introduction into the reforming unit. If necessary, the steam content of the gas can be controlled to some extent by adjusting the amount of steam fed to the gasifier.

The synthesis gas stream is introduced into reforming vessel 56 at a rate from about 100 to about 3000 volumes per volume of catalyst per hour. Rates in the upper part of this range are generally preferred. The upflowing gas contacts the catalyst particles making up the fluidized bed at a temperature between about 1000° and about 1800° F., preferably between about 1000° and about 1500° F., and at a pressure between about 100 and about 2000 psig. Under these conditions, ethane, ethylene and other $C_2+$ hydrocarbon compounds present in the gas react with steam to produce methane, carbon dioxide, carbon monoxide and hydrogen. Some methane reforming may also take place. Other reactions which may tend to occur include the water-gas shift reaction and carbon oxide methanation reactions. In the presence of a carbon-alkali metal catalyst, the synthesis gas composition will approach steam reforming and shift equilibrium and at low temperatures in the 1000° to 1200° F. range high yields of methane will be favored. Such temperatures also minimize catalyst losses due to gasification reactions and are therefore particularly preferred. The reactions occurring may be either exothermic or endothermic, depending upon the composition F., the synthesis gas feed stream, the feed temperature, and other conditions. At temperatures above about 1500° Fl, the reactions tend to become highly endothermic and hence the gas temperature in the reactor may tend to drop rapidly. At temperatures below about 1500° F., the reactions tend to become exothermic and hence the gas temperature may tend to rise. By regulating the temperature of the synthesis gas fed to the reforming unit, the reactions taking place can thus be controlled to eliminate polymerizable constituents without unduly affecting the methane content of the gas. Since this does not require a high heat input, the reforming step can be carried out in a fluidized, fixed or moving bed reactor and does not normally require a reforming furnace of the type used in conventional methane reforming operations.

The gas taken overhead from the reforming unit by means of line 58 will be essentially free of $C_2+$ hydrocarbon compounds. This removal of the hydrocarbons above methane from the synthesis gas eliminates constituents responsible for the formation of tars and oily waste water during subsequent gas treatment steps and obviates hydrocarbon polymerization problems which are otherwise apt to occur during the downstream water-gas shift step.

The overhead gas withdrawn through line 58 will normally be at an elevated temperature between about 1000° and about 1800° F., depending upon the particular reforming conditions employed. This gas stream can then be passed to the water-gas shift conversion unit for adjustment of the carbon monoxide-to-hydrogen ratio to the level required in the downstream methanation unit. The temperature at which the shift reaction is carried out will depend primarily upon the shift catalyst used. It is preferred to employ a carbon-alkali metal catalyst which will permit high conversions of carbon monoxide to carbon dioxide at temperatures in the range between about 400° and about 700° F. These catalysts, which may be identical to those employed in the reforming unit, are relatively uneffected by sulfur compounds in the gas. Other shift catalysts may also be employed.

Since the shift reaction will normally be carried out at a temperature considerably below the reforming temperature, heat present in the synthesis gas stream is recovered by passing the gas through heat transfer unit 60 in indirect heat exchange with water or other fluid introduced through line 61 and withdrawn through line 62. The heat recovered in heat transfer units 51 and 60 is normally lost in conventional processes because of the necessity for quenching the gas to remove tar-forming constituents which would otherwise have a deleterious effect upon the shift catalyst. The cooled gas is withdrawn from the transfer unit through line 63 and can then be introduced into fluidized bed shift conversion unit 64 by means of line 65. Depending upon the carbon monoxide-to-hydrogen ratio desired in the methanation step and other factors, at least part of the gas may be bypassed around the shift reactor through line 66.

In the shift unit, steam reacts with carbon monoxide in the gas to produce carbon dioxide and liberate hydrogen. Typical reaction conditions in such a unit may involve temperatures in the range from about 400° to about 700° F., pressures between about 100 and about 2000 psig, and gas feed rates between about 300 and about 3000 volumes of feed per volume of catalyst per hour, based on dry gas under standard conditions. The gas fed to the reactor will normally include sufficient steam for the reaction but additional steam may be added through line 67 if needed. The shifted gas stream is withdrawn from reactor 64 through line 68, mixed with any gas bypassed through line 66, and may then be passed through heat recovery unit 70 for the recovery of low level heat. In unit 70, the gas stream is passed in indirect heat exchange with water or other heat transfer medium introduced through line 71 and withdrawn by means of line 72. Here as much heat as is economically feasible may be recovered from the gas before it is treated for the removal of hydrogen sulfide, carbon dioxide and other contaminants. This low level heat recovery further improves the thermal efficiency of the process and often permits significant savings. The cooled gas is withdrawn through line 73.

The gas withdrawn from heat transfer unit 70 through line 73 is introduced into scrubber 74 and contacted with a solvent introduced through line 75 for the removal of carbon dioxide, hydrogen sulfide and other acidic constituents present in the gas stream. Solvents which may be employed include monoethanolamine, diethanolamine, solutions of sodium salts of amino acids, methanol, hot potassium carbonate and the like. Spent solvent containing carbon dioxide, hydrogen sulfide and other contaminants is withdrawn through line 76 and will normally be regenerated by flashing at reduced pressure and the injection of steam. The particular regeneration technique employed will depend in part upon the solvent selected and the type and amount of contaminants present. The resulting hydrogen-rich gas is taken overhead from the scrubber through line 77 and introduced into the coil of furnace 78 where it is heated to a methanation temperature of from about 800° to about 1500° F.

The methanation process employed will normally be carried out in multiple stages, provisions being made for cooling the gas between successive stages to recover the exothermic heat which is liberated during the methanation process. This can be done in a series of separate reactors with heat exchangers or other heat recovery units interposed between adjacent reaction vessels but in some cases reactors containing two or more methanation stages and intercoolers or similar internal means for removing heat between stages may be employed. The reactors used may be fixed bed, moving bed or fluidized bed units. In the system shown in the drawing, two fixed bed reactors designated by reference numerals 80 and 90 and two heat exchangers or similar heat recovery units indicated by reference numerals 82 and 92 are provided. The reactors shown are of the downflow type in which the gas moves downwardly through catalyst particles supported on trays or similar internal supporting elements but other type units can also be employed.

Any of a variety of conventional methanation catalysts may be used in the methanation reactors. The most effective conventional catalysts have generally been compositions which contain nickel as the primary constituent and include small amounts of a promoter such as thorium oxide, magnesium oxide, aluminum oxide, potassium oxide, calcium oxide, potassium carbonate, manganese or the like. The promoters alter the chemical and physical characteristics of the catalyst surface and in low concentrations tend to improve the yield or selectivity obtained with the catalysts. These materials may be employed in conjunction with carriers such as kieselguhr, pumice, infusorial earth, asbestos, silica, alumina or the like. Nickel on alumina containing a small amount of potassium carbonate as a carrier has generally been considered by those skilled in the art as the best conventional methanation catalyst.

In the presence of the methanation catalyst, hydrogen and carbon oxides present in the synthesis gas react to form methane and thus increase the heating value of the gas. The methanation reaction will normally be carried out at a temperature in the range between about 800° F. and about 1500° F. and at a pressure between about atmospheric and about 2000 psig. It is normally advantageous to operate the unit so that the temperature in each stage is higher than that in the following stages. To control the temperature in the various stages, the gas is cooled in heat transfer unit 82 by means of water or other cooling fluid introduced through line 84 and withdrawn through line 86. Although only two methanation stages are shown in the drawing, it will be understood that a single stage methanation unit or a unit containing more than two stages can be employed if desired. The gas withdrawn from the final stage of the methanation unit is cooled in heat transfer unit 92 by means of water or other fluid introduced through line 94 and withdrawn through line 96 to permit the recovery of as much heat as is economically feasible. The resulting methane-rich gas can then be further treated, sent to storage, or used as a fuel.

In lieu of treating the reformed synthesis gas for the removal of carbon dioxide, hydrogen sulfide, and similar acidic constituents prior to methanation as described above, it may in some cases be preferred to pass the gas from the reforming unit or shift reactor to a methanation unit containing a carbon-alkali metal catalyst. Studies have shown that such catalysts effectively catalyze the reaction of hydrogen and carbon oxides to form methane and that this made of operation may permit further heat economics. Since the carbon-alkali metal catalysts are resistant to sulfur poisoning, the carbon dioxide not consumed in the methanation reaction and hydrogen sulfide present in the gas can be removed by conventional means following the methanation reaction. The methanation conditions employed may be similar to those described earlier. A further modification of the process shown in the drawing is the omission of the methanation step and the recovery of hydrogen from the shifted gas for use in coal liquefaction and other operations requiring hydrogen gas. Still other modifications which can be made without departing from the invention will be apparent to those skilled in the art.

We claim:

1. A method for the removal of condensable tar-forming constituents from a hot mixture of hydrogen, carbon monoxide, carbon dioxide, methane, condensable tar-forming constituents, and steam withdrawn from a high temperature gasification zone without scrubbing said mixture with water or oil which comprises cooling said hot mixture of gases to a steam reforming temperature below the gasification temperature, contacting the cooled gases at said reforming temperature with a steam reforming catalyst under low severity steam reforming conditions in a steam reforming zone in the presence of sufficient steam to reform said tar-forming constituents, withdrawing a hot gas stream substantially free of said tar-forming constituents from said reforming zone, and thereafter further treating said gas by shifting the hydrogen-to-carbon monoxide ratio and methanating the shifted gas.

2. A method as defined by claim 1 wherein steam is added to said mixture before the cooled gases are contacted with said reforming catalyst.

3. A method as defined by claim 1 wherein said catalyst comprises a carbon-alkali metal catalyst.

* * * * *